(12) United States Patent
Andersson et al.

(10) Patent No.: US 7,537,722 B2
(45) Date of Patent: May 26, 2009

(54) DEVICE AND ARRANGEMENT FOR PRODUCING A THREE-DIMENSIONAL OBJECT

(75) Inventors: Lars-Erik Andersson, Helsingborg (SE); Morgan Larsson, Göteborg (SE)

(73) Assignee: Arcam AB, Gothenburg (SE)

( * ) Notice: Subject to any disclaimer, the term of this patent is extended or adjusted under 35 U.S.C. 154(b) by 115 days.

(21) Appl. No.: 10/258,490

(22) PCT Filed: Apr. 27, 2001

(86) PCT No.: PCT/SE01/00932

§ 371 (c)(1),
(2), (4) Date: Aug. 13, 2003

(87) PCT Pub. No.: WO01/81031

PCT Pub. Date: Nov. 1, 2001

(65) Prior Publication Data

US 2004/0026807 A1    Feb. 12, 2004

(30) Foreign Application Priority Data

Apr. 27, 2000    (SE) .................................... 0001557

(51) Int. Cl.
*B29C 35/08*    (2006.01)
*B29C 41/02*    (2006.01)

(52) U.S. Cl. ....................... 264/497; 264/40.6; 425/143; 425/174.4

(58) Field of Classification Search ................ 264/40.1, 264/40.6, 113, 497; 425/135, 143, 174.4, 425/375
See application file for complete search history.

(56) References Cited

U.S. PATENT DOCUMENTS

| 4,863,538 | A |   | 9/1989 | Deckard |
| 5,017,317 | A | * | 5/1991 | Marcus ......................... 264/81 |
| 5,106,288 | A | * | 4/1992 | Hughes ................... 425/174.4 |
| 5,427,733 | A |   | 6/1995 | Benda et al. |
| 5,753,171 | A |   | 5/1998 | Serbin et al. |
| 5,908,569 | A | * | 6/1999 | Wilkening et al. .......... 219/385 |

FOREIGN PATENT DOCUMENTS

EP    0 289 116 A1    11/1988
WO    WO 9426446 A1    11/1994

* cited by examiner

*Primary Examiner*—Leo B Tentoni
(74) *Attorney, Agent, or Firm*—Birch, Stewart, Kolasch & Birch, LLP (57) ABSTRACT

A device for manufacturing a three-dimensional product, which device comprises a work table on which said three-dimensional product is to be built, a powder dispenser which is arranged to lay down a thin layer of powder on the work table for the formation of a powder bed, a ray gun for giving off energy to the powder whereby fusion of the powder takes place, members for controlling of the beam released by the ray gun across said powder bed for the formation of a cross section of said three-dimensional product through fusion of parts of said powder bed, and a controlling computer in which information about successive cross sections of the three-dimensional product is stored, which cross sections build the three-dimensional product, the controlling computer intended to control said members for guiding the ray gun across the powder bed according to a running schedule forming a cross section of said three-dimensional body, whereby said three-dimensional product is formed by successive fusion of successively formed cross sections from powder layers successively laid down by the powder dispenser.

17 Claims, 5 Drawing Sheets

DEVICE AND ARRANGEMENT FOR PRODUCING A THREE-DIMENSIONAL OBJECT

BACKGROUND OF THE INVENTION

1. Field of the Invention

The invention relates to a device and a method for manufacturing of a three-dimensional product through successive fusion of chosen parts of powder layers, placed on a worktable.

2. Description of the Related Art

A device is previously known, e.g. through U.S. Pat. No. 4,863,538, for manufacturing of a three-dimensional product through successive fusion of chosen parts of powder layers, applied to a worktable. The device comprises a work table on which said three-dimensional product is to be formed, a powder dispenser, arranged to lay down a thin layer of powder on the work table for the formation of a powder bed, a ray gun for delivering of energy to the powder whereby fusion of the powder takes place, elements for control of the ray given off by the ray gun over said powder bed for the formation of a cross section of said three-dimensional product through fusion of parts of said powder bed, and a controlling computer, in which information is stored concerning consecutive cross sections of the three-dimensional product. The three-dimensional product is built up through fusion of chosen parts of consecutively added layers of powder. The controlling computer is intended for the control of deflection elements for the ray generated by the ray gun over the powder bed in accordance with a running schedule, which depicts a predetermined pattern. When the running schedule has fused the desired area of one powder layer, a cross section of said three-dimensional body has been formed. A three-dimensional product is formed through consecutive fusions of consecutively formed cross sections of powder layers, successively laid down by the powder dispenser.

When a device according to the state of the art as utilized for manufacturing of three-dimensional products, it has become apparent that deviations from the desired shape, size, and strength arise.

SUMMARY OF THE INVENTION

The present invention provides a device for the manufacturing of three-dimensional bodies through successive fusion of chosen parts of powder layers, laid down on a work table, in which reduction of deviation from the desired form, size, and strength of a three-dimensional body is made possible.

By providing an element for the sensing of the temperature distribution of a surface layer, positioned on the powder bed, measurement and correction of the characteristics of the surface are made possible, whereby a product with reduced deviation from desired dimensions and surface irregularity can be achieved. The invention renders it possible to ascertain that the fusion takes place within a defined temperature range, whereby the risk is reduced for appearance of defects, e.g., through vaporization or boiling of the material. Vaporization and boiling of the material may give rise to welding sparks or other surface irregularities. This element also allows measurement of the cooling temperature of specific fused parts in a powder layer, whereby the risk for appearance, and the size, of any surface tension in the fused part may be reduced, thereby reducing unwanted changes in shape. Further, measurement of the dimensions of the cross section is made possible, whereby a comparison of the dimensions of the formed cross section with the intended cross section of the object can be used to calibrate the controlling elements of the ray gun. The element also allows measurement of the temperature of the unmelted powder bed, whereby maintenance of an advantageous temperature from the point of view of the process can be monitored.

According to the invention, information on the temperature distribution in the surface layer of the powder bed is fed back to the control computer for adjustment of the running schedule over the surface layer of the powder bed. Changing the running schedule and the power and/or appearance of the beam enables a correct temperature to be maintained in the different parts of the powder bed.

In a further embodiment of the invention, the information concerning the temperature distribution in the surface layer of the powder bed is utilized to increase energy delivery within areas of the surface layer of the powder bed, in which the temperature is too low, and to decrease the delivery of energy within areas in which the temperature is too high, whereby a less fluctuating working temperature in the cross sections is obtained. Through adaptation of the energy delivery to specific parts, a more correct temperature distribution is obtained, whereby the quality of the product can be improved.

In a further embodiment of the invention, the device is arranged to control the energy delivery from the ray gun in areas fused within the presently uppermost powder layer, in such a way that the maximum temperature after fusion in these areas is within a limited range. By controlling the energy delivery in such a way that too high temperatures are avoided, the risk of boiling and vaporizing the material, with ensuing defects, can be reduced.

In yet a further embodiment of the invention, said information on the temperature distribution is utilized to control energy delivery from a ray gun, which is part of the device, to the powder bed, in areas which are being fused within the presently uppermost powder layer, and which are to be united with areas within a subsequent layer, in such a way that the minimum temperature in these areas does not fall below a predetermined limit. By ascertaining that the temperature does not fall below a predetermined limit, the risk for appearance of surface tension, with ensuing deformation of the product, can be reduced.

In yet another embodiment of the invention, said information on the temperature distribution is utilized to control the energy delivery from the ray gun to the powder bed in unfused areas within the surface layer of the powder bed, in such a way that the temperature within these areas does not fall below a second predetermined limit. By maintaining a certain temperature in the powder bed not intended to be fused, the cooling process in areas already fused or to be fused can be controlled more closely on the one hand, and on the other the disturbances arising from transfer of the beam across areas not intended to be fused, in order to reach different areas scheduled for fusion, can be reduced.

In a still further embodiment, the surface irregularity is measured, preferably by a camera that registers shadow formation on the surface, whereby the surface structure can be read. Upon registration of occurrence of surface irregularities, e.g., arising from a welding spark or in some other way, the ray gun can be ordered to an identified coordinate in order to melt down the identified irregularity.

In one embodiment of the invention, the powder bed and the ray gun are enclosed in a chamber, which is equipped with a transparent window, protected by a film, which is feedingly arranged along the window, whereby new film is being fed. By feeding the film as it is being coated, the transparency through the film and through the window can be maintained.

A second aspect of the invention provides a method for the manufacturing of three-dimensional bodies through successive fusion of parts of a powder bed, which parts correspond to consecutive cross sections of the three-dimensional body, in which reduction of deviation from the desired form, size, and strength of a three-dimensional body is made possible.

By providing an element for the sensing of surface characteristics of a surface layer, positioned on the powder bed, measurement and correction of the characteristics of the surface are made possible, whereby a product with reduced deviation from desired dimensions and surface irregularity can be achieved. In one embodiment, the temperature distribution in a surface layer in the powder bed is registered, which enables temperature control during fusion of the powder particles. This makes it possible to ascertain that the melting takes place within a defined temperature range, whereby the risk for occurrence of defects, e.g., through boiling or vaporizing of the material, can be reduced. This element also allows measurement of the cooling temperature of specific fused parts in a powder layer, whereby the risk for appearance of any surface tension in the fused part may be reduced, thereby reducing the risk for occurrence of unwanted changes in shape. Further, measurement of the dimensions of the cross section is mad possible, whereby a comparison of the dimensions of the formed cross section with the intended cross section of the object can be used to calibrate the controlling elements of the ray gun. The element also allows measurement of the temperature of the unmelted powder bed, whereby maintenance of an advantageous temperature from the point of view of the process can be monitored.

In yet another embodiment, the surface irregularity is measured, preferably by a camera that registers shadow formation on the surface, whereby the surface structure can be read. Upon registration of occurrence of surface irregularities, e.g., arising from a welding spark or in some other way, the ray gun can be ordered to an identified coordinate in order to melt down the identified irregularity.

Further preferred embodiments are given in the enclosed sub-claims.

BRIEF DESCRIPTION OF THE FIGURES

The invention will be further described below, in conjunction with the enclosed drawings, in which.

DETAILED DESCRIPTION OF THE INVENTION

Figure 1:
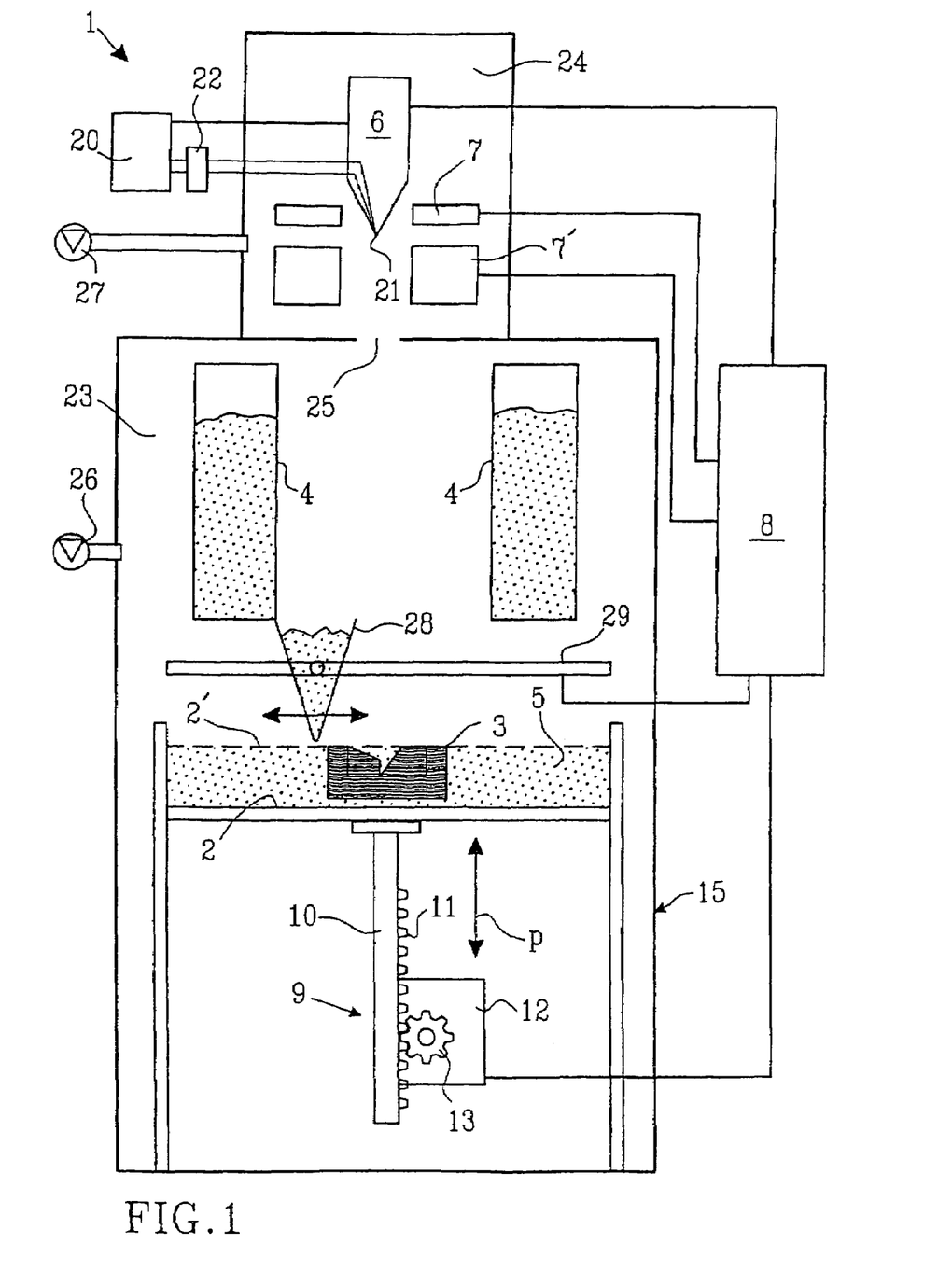
FIG. 1 shows a cross section of the invention.

In FIG. 1, a device is shown for the manufacturing of a three-dimensional product, generally designated by 1. The device comprises a work table 2, upon which a three-dimensional product 3 is to be built, one or more powder dispensers 4, and members 28 arranged to lay down a thin layer of powder on the work table 2 for the formation of a powder bed 5, a ray gun 6 for releasing energy to the powder bed whereby fusion of parts of the powder bed takes place, control members 7 for the beam released by the ray gun 6 over said work table to form a cross-section of said three dimensional product through fusion of said powder, and a controlling computer 8 in which information is stored on sequential cross-sections of the three-dimensional product, which cross-sections constitute the three-dimensional product. During a work cycle the table will be lowered successively in relation to the ray gun after each added layer of powder. In order to make this movement possible, the worktable is in one embodiment of the invention arranged movably in vertical direction, i.e., the direction indicated by the arrow P. This means that the worktable starts in an initial position 2', in a position where a first powder layer of necessary thickness has been laid down. In order not to damage the underlying worktable, and in order to provide sufficient quality of this layer, it is made thicker than the other applied layers, whereby melt-through of this first layer is avoided. The worktable is thereafter lowered in connection with laying down a new powder layer for the formation of a new cross-section of the three-dimensional product. In one embodiment of the invention, the worktable is for this purpose supported by a scaffold 9, comprising at least one rack 10, supplied with cogging 11. A step or servo engine 12, equipped with a gear 13, positions the worktable in the desired vertical position. Other devices for adjustment of the working height of a worktable, known to those skilled in the art, can also be used. For example, adjusting screws can be used instead of racks.

The member 28 is arranged to cooperate with said powder dispensers for refilling of material. Further, the sweep of the member 28 across the work surface is driven in a known manner through a servo engine (not shown), which displaces the member 28 along a guide rail 29, running along the powder bed.

At the laying down of a new powder layer, the thickness of the powder layer will be governed by how far the worktable has been lowered in relation to the previous layer. This means that the thickness of the layer may be varied as desired. Thus, it is possible to make the layers thinner when a cross section exhibits greater change in shape between adjacent layers, whereby a higher fineness of the surface is achieved, and to make layers equal to the maximum penetration depth of the beam when small or no changes in shape occurs.

In the embodiment of the invention the ray gun 6 is constituted by an electron gun, whereby the control members 7 for the beam of the ray gun is constituted by deflection coils. The deflection coil generates a magnetic field that controls the beam generated by the electron gun, whereby melting of the surface layer of the powder bed in a desired position is achieved. Further, ray guns comprise a high voltage circuit 20, which is intended to supply, in a known manner, the ray gun with an acceleration voltage for an emitter electrode 21, arranged at the ray gun. The emitter electrode is connected to a power source 22 in a known manner, which source is utilized for heating the emitter electrode 21, whereby electrons are liberated. The function and composition of the ray gun are well known to those skilled in the art.

The deflection coil is controlled by the controlling computer 8, according to a laid-down running schedule for each layer to be fused, whereby control of the beam in accordance with the desired running schedule may be achieved. A detailed description concerning the generation and correction of running schedules follows below, in connection to the description of the drawing FIGS. 4-6.

Further, there is at least one focusing coil 7', which is arranged to focus the beam onto the surface of the powder bed on the worktable.

The deflection coils and the focusing coils may be arranged according to a multitude of alternatives well known to those knowledgeable in the art.

The apparatus is contained in a housing 15, which surrounds the ray gun 6, and the powder bed 2. The casing comprises a first chamber 23, surrounding the powder bed, and a second chamber 24, surrounding the ray gun 6. The first chamber 23 and the second chamber 24 communicates through a channel 25, which allows emitted electrons, which have been accelerated in the high voltage field of the second chamber, to proceed into the first chamber, thereafter to impinge on the powder bed on the work table 2.

In the embodiment, the first chamber is connected to a vacuum pump 26, which lowers the pressure in the first chamber 23 to a pressure of preferably about $10^{-3}$–$10^{-5}$ mBar. The second chamber 24 is preferably connected to a vacuum pump 27, which lowers the pressure in the second chamber 24 to a pressure of about $10^{-4}$–$10^{-6}$ mBar. In an alternate embodiment, the first and second chambers may both be connected to the same vacuum pump.

The controlling computer 8 is preferably further connected to the ray gun 6, for regulating the emitted power of the ray gun, and connected to the stepping motor 12 for adjustment of the vertical position 2 of the work table between each consecutive laying down of powder layers, whereby the individual thickness of the powder layers may be varied.

Further, the controlling computer is connected to said member 28 for laying down powder on the work surface. This member is arranged in order to sweep across the work surface, whereby a layer of powder is lain down. The member 28 is driven by a servo engine (not shown), which is controlled by said controlling computer 8. The controlling computer controls the duration of the sweep, and secures that powder is refilled as needed. For this purpose, load indicators may be arranged in the member 28, whereby the controlling computer can be informed that the member is empty.

Figure 2:
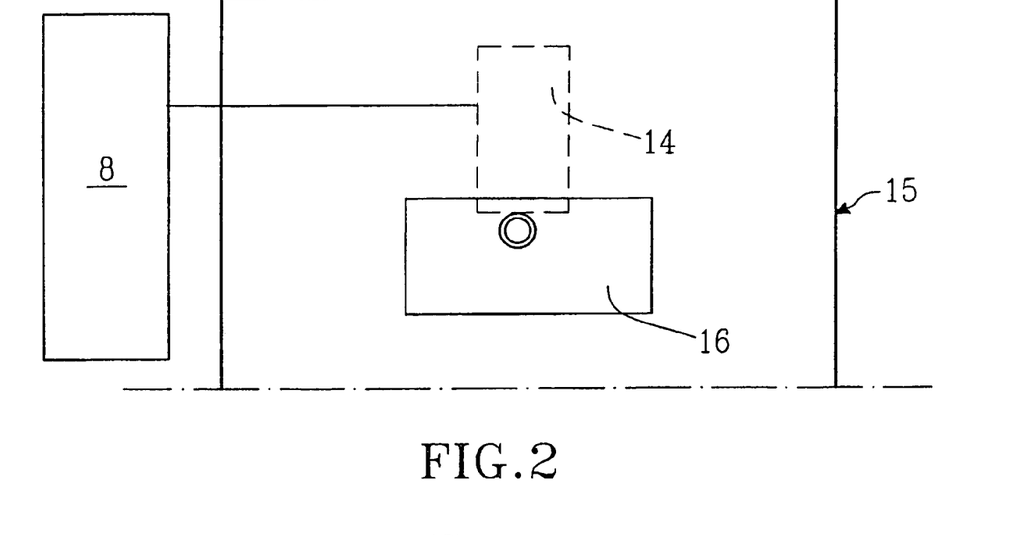
FIG. 2 shows a side view of a chamber equipped with a transparent window.
Figure 3:
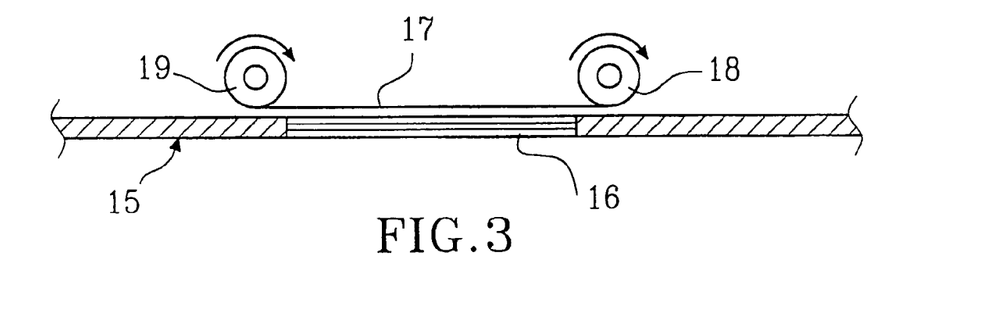
FIG. 3 shows a device for feeding and fixing of a protective film for maintaining transparency of the window.

According to what is shown in FIG. 2, the device further comprises members 14 for sensing the surface characteristics of a surface layer at the powder bed. This member 14 for sensing the temperature distribution of a surface layer at the powder bed 5 is preferably constituted by a camera. In one embodiment of the invention, the camera is utilized partly for measuring the temperature distribution on the surface layer, and partly for measuring the occurrence of surface irregularities through the shadow formation caused by irregularities on a surface. Information of the temperature distribution is used partly to achieve a temperature distribution as smooth as possible across the parts of the surface layer, which are to be melted, and, partly, information may be used to control any deviation in measures between the generated three-dimensional product and the original, since the temperature distribution reflects the shape of the product. In the embodiment of the invention, the video camera is mounted on the outside of the housing 15 that contains the powder bed 5 and the ray gun 6. In order to make the measurement of temperature possible, the housing is provided with a transparent window 16. The powder bed 5 is visible for the camera through this window. In the embodiment of the invention, which is shown in FIG. 3, the window 16 is covered by a protective film 17. The protective film is fed from a feeder unit 18 to a collection unit 19, whereby the film is successively replaced, which has the effect that transparency can be maintained. The protective film is necessary, since deposits arise as a consequence of the melting process.

Figure 4:
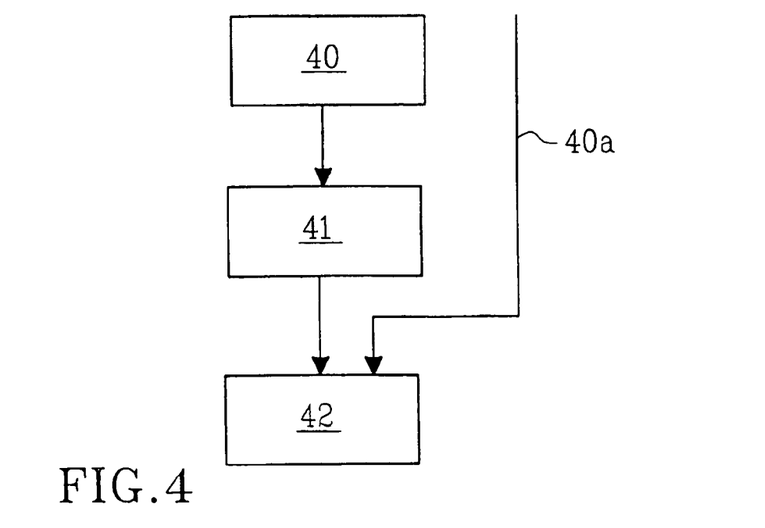
FIG. 4 shows a flow chart for the generation of primary running schedules.
Figure 7:
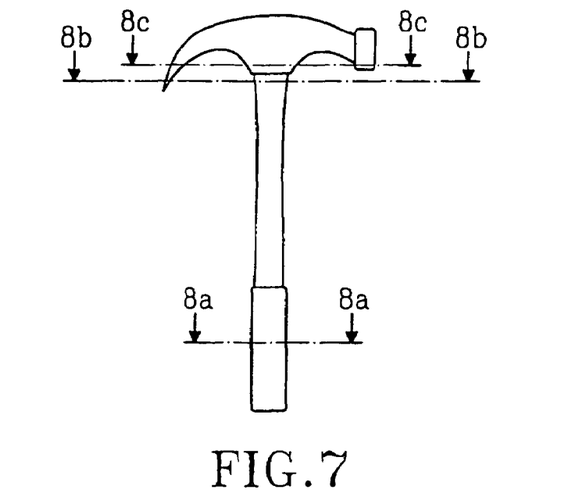
FIG. 7 shows the schematic build-up of a three-dimensional object.
Figure 8A:
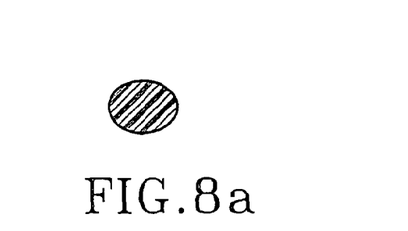
FIG. 8 shows a number of cross sections from FIG. 7.
Figure 8B:
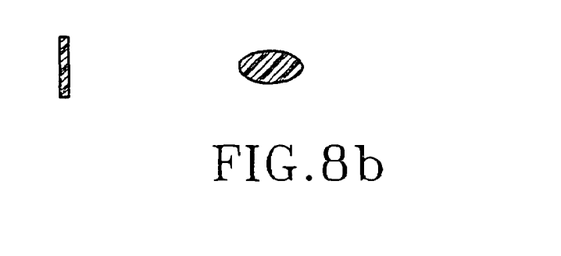
Figure 8C:
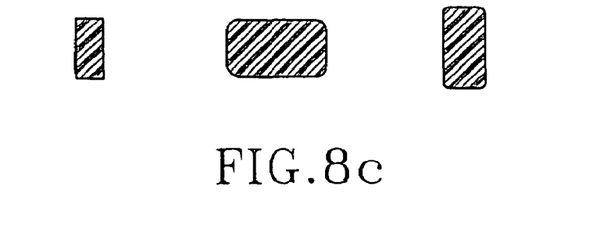

In FIG. 4, the procedure for generating primary running schedules is shown schematically. In a first step 40a 3D model is generated, for example, in a CAD program, of the product to be manufactured, alternatively a pre-generated 3D model of the product to be manufactured is fed to the controlling computer 8. Thereafter, a matrix is generated in a second step 41, containing information of the appearance of cross sections of the product. In FIG. 7, a model of a hammer is shown, together with examples of thereto belonging cross sections 8a-8c. These cross sections are also shown in FIGS. 8a-8c. The cross sections are laid down in a density corresponding to the thickness of the separate layers to be fused in order to make up the completed product. Advantageously, the thickness can be varied between the different layers. For example, it is advantageous to make the layers thinner in areas with a greater variation in the appearance of the cross section between adjacent layers. Thus, during the generation of the cross sections a matrix is created, which contains the information about the appearance of all cross sections, which together makes up the three-dimensional product.

When the cross section has been generated in a third step 42, a primary running schedule is generated for each cross section. The generation of primary running schedules is based partly on recognition of the shape of the parts that constitute a cross section, and partly on how the running schedule affects the cooling temperature of local parts of a cross section. The object is to create a running schedule that entails that the cooling temperature is as equal as possible in the parts that have been fused before the next layer is laid down, while at the same time keeping the cooling temperature within a desired range in order to reduce the risk for the occurrence of shrinkage strain in the product, and to reduce the magnitude of occurring shrinkage strain in the product, leading to deformation of the product.

Primarily, a primary running schedule is generated, based on the shape of separate parts included in the cross section.

Thus, in the embodiment of the invention, primary running schedules are laid down, on the basis of experience of which running schedules provides a good temperature distribution of the cooling temperature of the cross section, whereby the risk for shrinkage strain in the product, leading to deformation of the product, may be reduced. For this purpose, a set of running schedules for areas of different shapes is stored in a memory. In the embodiment, this memory is updated during the course of evaluation of the results from correcting the running schedule, whereby a self-educating system is obtained.

In an alternative embodiment of the invention, preformed cross sections, which have been generated by a separate computer, is fed to a memory in the controlling computer, where said primary running schedules are generated. In this case, the information is obtained directly to the third step 42, through an external source 40a.

Figure 5:
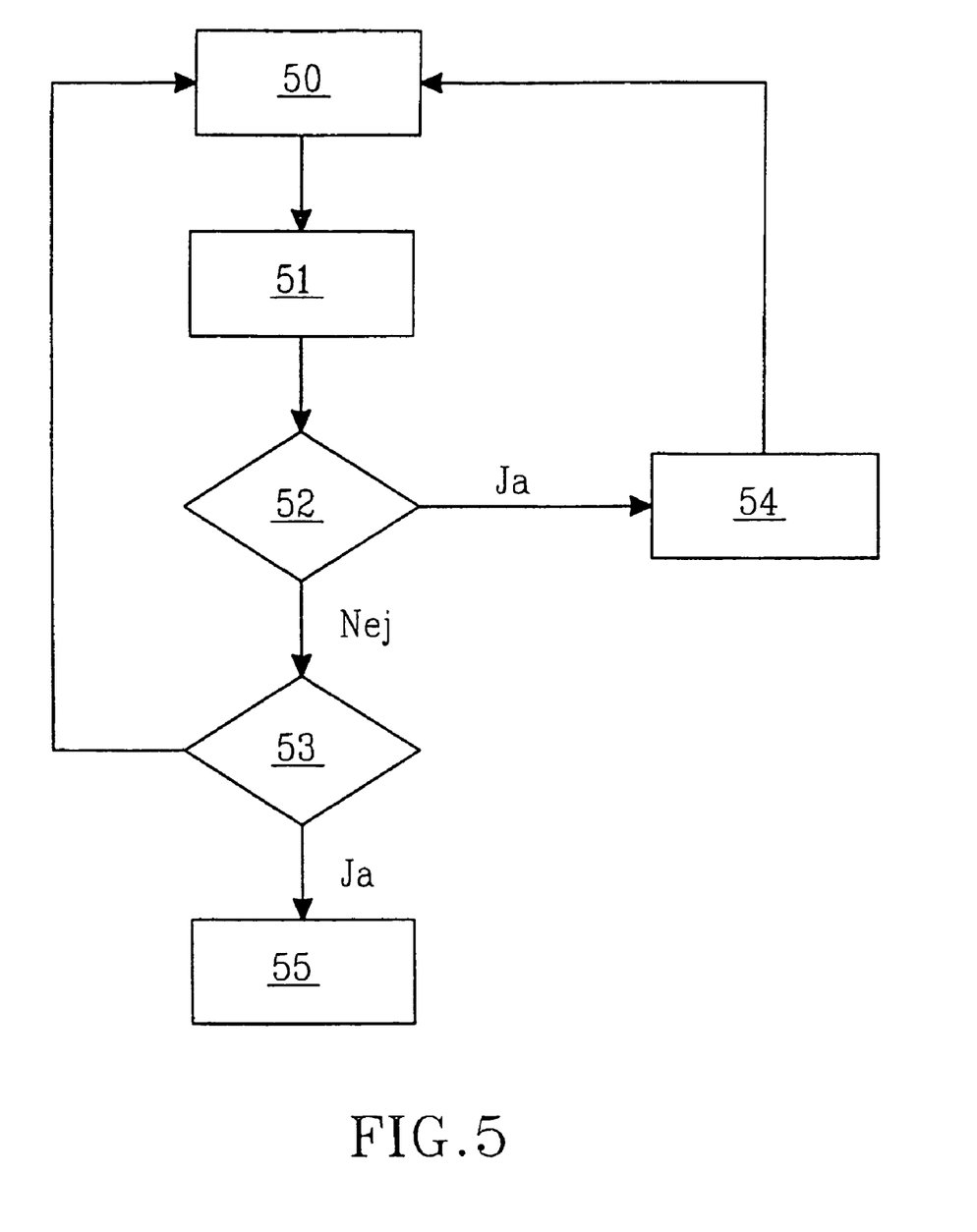
FIG. 5 shows a flow chart for a running schedule of the device.

In FIG. 5, a procedure is shown schematically, in which the beam from the ray gun is controlled over the powder bed in order to generate a cross section of a product. In a first step 50, controlling of the beam over the powder bed is initiated, according to the primary running schedule defined in step 42. In the next step 51, the temperature distribution of the surface layer of the powder bed is measured by the camera. Thereafter, a temperature distribution matrix, $T_{ij\text{-}measured}$, is generated from the measured temperature distribution, in which the temperature of small sub-areas of the surface layer of the powder bed is stored. When the matrix is generated, each temperature value $T_{ij\text{-}measured}$ in the matrix is compared with the desired value in a matrix of desired values, $T_{ij\text{-}desired}$. Coarsely, the surface layer of the powder bed may be divided into three categories. Firstly, areas in which fusion is taking place through machining by the ray gun. In these areas, a maximum melting temperature $T_{ij\text{-}max}$ is of interest. Secondly, areas already fused, and which are thereby cooling. In these areas, a minimum allowed cooling temperature $T_{ij\text{-}cooling\text{-}min}$ is of interest, since too low a cooling temperature gives rise to tensions, and thereby to a deformation of the surface layer. Thirdly, areas not machined by the ray gun. In these areas, the bed temperature, $T_{ij\text{-}bed}$ is of interest. It is also possible to compare the temperature only in machined areas, whereby $T_{ij\text{-}bed}$ is not stored and/or controlled.

In a third step 52, it is tested whether $T_{ij\text{-}measured}$ deviates from the desired value $T_{ij\text{-}desired}$, and whether the deviation exceeds allowed limits. The limits, $\Delta T_{ij\text{-}max}$, $\Delta T_{ij\text{-}cooling}$, and $\Delta T_{ij\text{-}bed}$, belonging to the three different categories, are stored in the controlling computer 8. It is also possible not to control the bed temperature. In this case, the belonging limit value is not stored. In a fourth step 53, it is investigated whether the machining of the surface layer is complete, provided that the deviation between $T_{ij\text{-}measured}$ and $T_{ij\text{-}desired}$ does not exceed this limit. If this is not the case, the run continues according to the effective running schedule, whereby the abovementioned method steps 50-53 are run through one further time. If the deviation between $T_{ij\text{-}measured}$ and $T_{ij\text{-}desired}$ exceeds either of said limits, a correction of the running schedule 42 is carried out in a fifth step. Said correction takes place in the embodiment according to the scheme shown in FIG. 6. In the embodiment of the invention, a new powder layer is not laid down until the completion of each layer, whereby the product is built through successive fusions until the product is completed. In this case, laying of a new layer is begun after a sixth step 55, provided that the product in its entirety is not completed, when it is noted in the fourth step 53 that the running schedule for a layer is completed.

Figure 6:
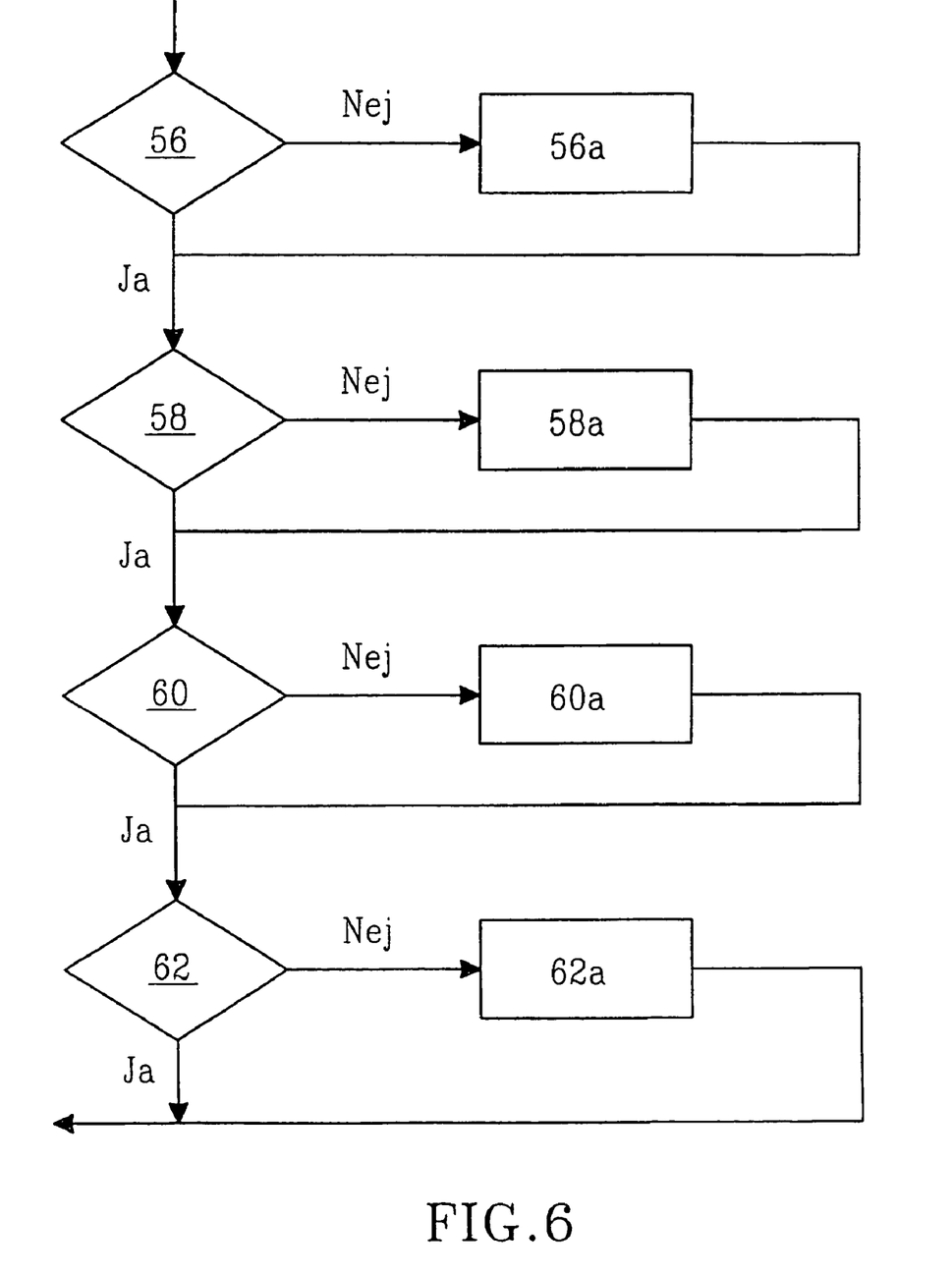
FIG. 6 shows a flow chart for the correction of said running schedule.

In the embodiment, the running schedule comprises the following method steps: In a first step 56, $T_{ij\text{-}max}$ is compared to $T_{ij\text{-}max\text{-}desired}$. If $T_{ij\text{-}max}$ deviates from $T_{ij\text{-}max\text{-}desired}$ exceeding $\Delta T_{ij\text{-}max}$, the energy supply to the powder layer is calibrated in a step 56a, either by changing the power of the beam, or by changing the sweep speed of the beam. In a first step 58, $T_{ij\text{-}cooling}$ is compared to $T_{ij\text{-}cooling\text{-}desired}$. If $T_{ij\text{-}cooling}$ deviates from $T_{ij\text{-}cooling\text{-}desired}$ exceeding $\Delta T_{ij\text{-}cooling}$, the running schedule for the beam is changed in a step 58a. There are several ways to modify the running schedule for a beam. One way to modify the running schedule is to allow the beam to reheat areas before they have cooled do much. The ray gun can then sweep across already fused areas with a lower energy intensity and/or a higher sweep rate.

In a third step 60, it is investigated whether $T_{ij\text{-}bed}$ deviates from $T_{ij\text{-}bed\text{-}desired}$. If the deviation exceeds $\Delta T_{ij\text{-}bed}$, the temperature of the bed may in one embodiment of the invention be corrected in a step 60a, for example, by making the beam sweep across the bed for delivery of energy. It is also possible to attach equipment for separate heating of the bed to the device.

It is also possible that a control of the size of the object to be manufactured takes place through the heat camera installed in the device. According to what has been described above, the bed, and the parts that have been fused, is measured. The recorded heat distribution totally reflects the shape of the object in a section of the three-dimensional body to be created. A control of the dimensions of the object can thereby be carried out in a fourth step 62, and a feedback of X-Y deflection of the beam of the ray gun may thereby be carried out. In the embodiment of the invention, this control is carried out in a step 62a, in which the deviation between measures on the cross section is determined, and, if the deviation is higher than allowed, the X-Y deflection of the ray gun is corrected.

Further, input signals from the camera may be utilized for identifying the occurrence of surface irregularities, for example, in the shape of a wielding spark. When the coordinates for surface irregularities have been identified, the running schedule may be updated to the identified coordinate in order to melt the surface irregularity.

The invention is not limited to the embodiment described above; for example, the ray gun may be constituted by a laser, whereby the deflection members are constituted by controllable mirrors and/or lenses.

The invention may be further utilized in a device for the manufacturing of a three-dimensional product through energy transfer from an energy source to a product raw material, which device comprises a work table on which said three-dimensional product is to be built, a dispenser arranged to lay down a thin layer of product raw material on the work table for the formation of a product bed, a member for giving off energy to selected areas of the surface of the product bed, whereby a phase transition of the product raw material is allowed for the formation of a solid cross section within said area, and a controlling computer handling a memory in which information about successive cross sections of the three-dimensional product is stored, which cross sections constitute the three-dimensional product, where the controlling computer is intended to control said member for releasing energy so that energy is supplied to said selected areas, whereby said three-dimensional product is formed through successive bonding of cross sections, successively formed from powder layers laid down by the powder dispenser.

In this case, the embodiment is not limited to fusion of powders through the radiation of the surface of a powder bed by a ray gun. The product raw material may be constituted by any material that, after a phase transition, forms a solid body, for example, solidification after melting or curing. The energy-releasing member may be constituted by an electron gun, a laser, controlled across the work surface, alternatively by an energy-releasing member with the ability to project a cross section directly on the product bed.

Otherwise, this embodiment may be equipped with all the characteristics, which are described in relation to the previously described embodiment.

The invention claimed is:

1. A device for manufacturing a three dimensional product, comprising:
   a work table on which said three dimensional product is to be built;
   a powder dispenser arranged to lay down a thin layer of powder on the work table for the formation of a powder bed;
   a ray gun for giving off energy to the powder whereby fusion of the powder takes place;
   members for controlling the beam released by the ray gun across said powder bed for the formation of a cross section of said three dimensional product through fusion of parts of said powder bed;
   a controlling computer storing information about successive cross sections of the three dimensional product, said successive cross sections build the three dimensional product, the controlling computer controlling said members to guide the ray gun across the powder bed according to a running schedule forming a cross section of said three dimensional body, said three dimensional product being formed by successive fusion of successively formed cross sections from powder layers successively laid down by the powder dispenser; and means for sensing the temperature distribution of a surface layer at the powder bed, wherein the surface layer of the powder bed is divided into three categories including:

areas in which fusion is taking place through machining by the ray gun where a melting temperature is measured, areas already fused, and which are thereby cooling where a cooling temperature is measured, and areas not machined by the ray gun, where a bed temperature is measured, said controlling computer is arranged to affect said running schedule for the ray gun based on information about the temperature distribution of the surface layer of the powder bed from said means for sensing of the temperature distribution, said means for sensing temperature distribution of a surface layer at the powder bed includes a camera, said temperature distribution of a surface layer constitutes a temperature distribution matrix that is stored in the controlling computer, the temperature distribution matrix comprising a plurality of temperature values corresponding to the three categories that the surface layer of the powder bed is divided into, the controlling computer compares the plurality of temperature values of the temperature distribution matrix with desired values corresponding to the three categories to determined any deviation, and for any deviation, the controlling computer makes a determination as to whether the deviation exceeds an allowed limit for the corresponding category.

2. The device according to claim 1, wherein said controlling computer is arranged to affect said running schedule for the ray gun such that the energy delivery within areas of the surface layer of the powder bed with too low temperature is increased and energy delivery within areas with too high temperature is decreased, whereby a more even working temperature of the cross sections is obtained.

3. The device according to claim 1 or 2, wherein said controlling computer is arranged to control, based on said information about the temperature distribution, the energy delivery from the ray gun to the powder bed such that the maximum temperature after fusion at areas within the presently uppermost powder layer is within a limited range.

4. The device according to claim 1 or 2, wherein said controlling computer is arranged to control, based on said information about the temperature distribution, the energy delivery from the ray gun to the powder bed at areas within the presently uppermost powder layer which are fused and which are to be united with areas in a subsequent layer so that the minimum temperature after fusion at these areas does not fall below a predetermined limit.

5. The device according to claim 1 or 2, wherein said controlling computer is arranged to control, based on said information about the temperature distribution, the energy delivery from the ray gun to the powder bed at areas which are fused within the presently uppermost powder layer so that the minimum temperature after fusion at these areas does not fall below a predetermined limit.

6. The device according to claim 1 or 2, wherein said controlling computer is arranged to control, based on said information about the temperature distribution, the energy delivery from the ray gun to the powder bed at areas within the uppermost layer of the powder bed that are not fused such that the temperature within these areas does not fall below a second predetermined limit.

7. The device according to claim 1 or 2, wherein said members for controlling the beam released by the ray gun are arranged to be calibrated using said information about the temperature distribution.

8. The device according to claim 1, wherein the product bed is situated in a closed chamber, the closed chamber exhibits a transparent window, and the camera is arranged to record a surface characteristic of the powder bed through this window.

9. The device according to claim 8, wherein the transparent window is protected by a film, and said film is arranged to be fed along the window so that transparency through the film and the window is maintained.

10. The device according to claim 1 or 2, wherein the ray gun is includes an electron gun, and the powder bed and the electron gun are enclosed within a vacuum chamber.

11. A method for the manufacturing of three dimensional bodies through successive fusion of parts of a powder bed, which parts correspond to successive cross sections of the three dimensional body, the method comprising:

laying down a powder layer on a work table;

supplying energy from a ray gun according to a predetermined running schedule for the powder layer;

fusing of the area of the powder layer selected according to said running schedule for the formation of a cross section of said three dimensional body;

forming of a three dimensional body through successive fusion of successively formed cross sections from powder layers successively laid down; and measuring the temperature distribution of a surface layer situated at the powder bed, wherein the surface layer of the powder bed is divided into three categories:

areas in which fusion is taking place through machining by the ray gun where a melting temperature is measured, areas already fused, and which are thereby cooling where a cooling temperature is measured, and areas not machined by the ray gun, where a bed temperature is measured, measuring the temperature distribution of a surface layer situated at the powder bed is carried out using a camera, said temperature distribution of a surface layer constitutes a temperature distribution matrix that is stored in the controlling computer, the temperature distribution matrix comprising a plurality of temperature values corresponding to the three categories that the surface layer of the powder bed is divided into the controlling computer compares the plurality of temperature values of the temperature distribution matrix with desired values corresponding to the three categories to determined any deviation, and for any deviation, the controlling computer makes a determination as to whether the deviation exceeds an allowed limit for the corresponding category.

12. The method according to claim 11, wherein the supplied energy is calibrated using the measured temperature distribution to achieve a correct melting temperature.

13. The method according to claim 11 or 12, wherein said running schedule is modified based on the measured temperature distribution to achieve a correct cooling temperature.

14. The method according to claim 13, wherein areas with a too low cooling temperature are reheated.

15. The method according to claim 13, wherein upon detection of an area with a too high cooling temperature, the running schedule is modified so that the build up rate within this area is decreased.

16. The method according to claim 11 or 12, wherein the bed temperature is detected and the bed is heated if the detected temperature falls below a predetermined limit.

17. The method according to any of the claim 11 or 12, wherein
- members are arranged at the ray gun for X-Y deflection of the beam, and
- the members are calibrated using the measured temperature distribution.

* * * * *